United States Patent
Toas et al.

(10) Patent No.: US 7,220,470 B2
(45) Date of Patent: *May 22, 2007

(54) MOISTURE REPELLENT AIR DUCT PRODUCTS

(75) Inventors: Murray S. Toas, Norristown, PA (US); John O. Ruid, Schwenksville, PA (US)

(73) Assignee: CertainTeed Corporation, Valley Forge, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/789,063

(22) Filed: Feb. 20, 2001

(65) Prior Publication Data

US 2002/0146521 A1    Oct. 10, 2002

(51) Int. Cl.
*B32B 1/08* (2006.01)
*B29D 22/00* (2006.01)
*B29D 23/00* (2006.01)

(52) U.S. Cl. .................... 428/35.7; 428/220; 138/146; 138/149; 138/153

(58) Field of Classification Search ................ 138/103, 138/118, 137, 140–141, 143, 144, 146, 147, 138/149, 177–178, DIG. 4, DIG. 7, 153, 138/124, 125; 428/34.5, 35.9, 36.1, 40.1, 428/149, 343, 411.1, 35.7, 220

See application file for complete search history.

(56) References Cited

U.S. PATENT DOCUMENTS

| | | | |
|---|---|---|---|
| 2,341,130 A | 2/1944 | Unsworth | |
| 2,428,591 A | 10/1947 | Slayter | |
| 2,467,291 A | 4/1949 | Brelsford et al. | |
| 2,619,151 A | 11/1952 | Sheidley | |
| 2,647,857 A | 8/1953 | Horne | |
| 2,695,855 A | 11/1954 | Stephens | |
| 2,768,026 A | 10/1956 | Stephens et al. | |
| 2,790,464 A | 4/1957 | Stephens et al. | |
| 2,825,389 A | 3/1958 | Stephens | |
| 2,881,110 A | 4/1959 | Walker et al. | |
| 2,938,737 A | 5/1960 | Walker et al. | |
| 3,002,857 A | 10/1961 | Stalego | |

(Continued)

FOREIGN PATENT DOCUMENTS

EP    0763690 A2    3/1997

(Continued)

OTHER PUBLICATIONS

Ultra Additives Catalog, DEE FO/AGITAN defoamers, reprinted Jan. 21, 2003 from http://www.ultraadditives.com.*

(Continued)

*Primary Examiner*—Michael C. Miggins
(74) *Attorney, Agent, or Firm*—Duane Morris LLP

(57) ABSTRACT

Water-resistant fibrous air duct insulation products and methods for making such products. The products may include a duct board or a duct tube including a first layer of resin-bonded fibrous mat having a second layer of durable, preferably non-woven, facing material adhered thereto, wherein the facing material defines the air stream surface for the board or tube. The duct board or tube is preferably rendered water-repellent at the air stream surface by incorporating a hydrophobic agent into the adhesive used to adhere the second layer to the first layer.

20 Claims, 2 Drawing Sheets

U.S. PATENT DOCUMENTS

| | | |
|---|---|---|
| 3,025,197 A | 3/1962 | Sheidley |
| 3,092,529 A | 6/1963 | Pearson |
| 3,093,037 A | 6/1963 | Ward, Jr. |
| 3,113,788 A | 12/1963 | Johnston |
| 3,212,529 A | 10/1965 | Ullman et al. |
| 3,242,527 A | 3/1966 | Rosenberg |
| 3,265,530 A | 8/1966 | Marzocchi et al. |
| 3,394,737 A | 7/1968 | Hoffmann et al. |
| 3,396,070 A | 8/1968 | Gambill et al. |
| 3,420,142 A | 1/1969 | Gale et al. |
| 3,425,978 A * | 2/1969 | Armour ............... 524/510 |
| 3,492,771 A | 2/1970 | Jones et al. |
| 3,507,730 A | 4/1970 | Gambill et al. |
| 3,549,473 A | 12/1970 | LeBlanc et al. |
| 3,557,840 A | 1/1971 | Maybee |
| 3,605,534 A | 9/1971 | Barr |
| 3,615,969 A | 10/1971 | Hegg |
| 3,616,181 A | 10/1971 | Stalego |
| 3,642,554 A | 2/1972 | Hensley |
| 3,642,560 A | 2/1972 | Marsh, Jr. et al. |
| 3,768,523 A | 10/1973 | Schroeder |
| 3,861,425 A | 1/1975 | Clark |
| 3,867,221 A | 2/1975 | Chant |
| 3,885,593 A | 5/1975 | Koerber et al. |
| 3,915,783 A | 10/1975 | Goppel et al. |
| 3,942,774 A | 3/1976 | Sokolow |
| 3,945,962 A | 3/1976 | Clark |
| 3,980,511 A | 9/1976 | Proucelle |
| 3,996,824 A | 12/1976 | Cailey |
| 4,002,367 A | 1/1977 | Thomas |
| 4,005,234 A | 1/1977 | Stroupe |
| 4,067,678 A | 1/1978 | Beranek, Jr. et al. |
| 4,070,954 A | 1/1978 | Cailey |
| 4,101,700 A | 7/1978 | Ray et al. |
| 4,175,159 A | 11/1979 | Raleigh |
| 4,179,808 A | 12/1979 | Smith |
| 4,183,379 A | 1/1980 | Marquette et al. |
| 4,196,755 A | 4/1980 | Kutnyak et al. |
| 4,226,662 A | 10/1980 | McCort |
| 4,243,075 A | 1/1981 | McPherson et al. |
| 4,304,267 A | 12/1981 | Campbell, Jr. |
| 4,310,585 A | 1/1982 | Shannon |
| 4,389,587 A | 6/1983 | Levine et al. |
| 4,456,637 A | 6/1984 | Takeda et al. |
| 4,528,053 A | 7/1985 | Auer |
| 4,573,715 A | 3/1986 | Armbruster |
| 4,621,013 A | 11/1986 | Holtrop et al. |
| 4,680,070 A | 7/1987 | Hughes |
| 4,709,523 A | 12/1987 | Broderick et al. |
| 4,758,395 A | 7/1988 | Zion |
| 4,824,714 A | 4/1989 | Gest |
| 4,839,222 A | 6/1989 | Jain |
| 4,887,663 A | 12/1989 | Auxier et al. |
| 4,895,745 A * | 1/1990 | Vesley et al. ............ 428/40 |
| 4,909,282 A | 3/1990 | Staugaard |
| 4,968,556 A | 11/1990 | Jain |
| 4,983,081 A | 1/1991 | Cunningham, Jr. |
| 4,990,370 A | 2/1991 | Terry et al. |
| 5,008,131 A | 4/1991 | Bakhshi |
| 5,009,932 A | 4/1991 | Klett et al. |
| 5,020,481 A | 6/1991 | Nelson |
| 5,144,795 A | 9/1992 | Field |
| 5,169,700 A | 12/1992 | Meier et al. |
| 5,186,704 A | 2/1993 | Cunningham, Jr. |
| 5,300,562 A * | 4/1994 | Coventry et al. .......... 524/841 |
| 5,300,592 A | 4/1994 | Kanagawa et al. |
| 5,310,594 A | 5/1994 | Holland et al. |
| 5,314,719 A | 5/1994 | Batdorf et al. |
| 5,370,919 A * | 12/1994 | Fiews et al. ............ 428/96 |
| 5,371,989 A | 12/1994 | Lehnert et al. |
| 5,379,806 A | 1/1995 | Matthews et al. |
| 5,385,610 A | 1/1995 | Deerer et al. |
| 5,391,840 A | 2/1995 | Hughes et al. |
| 5,397,631 A | 3/1995 | Green et al. |
| 5,421,938 A | 6/1995 | Cunningham, Jr. |
| 5,460,206 A | 10/1995 | Sansoucy |
| 5,487,412 A * | 1/1996 | Matthews et al. .......... 138/149 |
| 5,528,904 A | 6/1996 | Jones et al. |
| 5,534,298 A | 7/1996 | Cross et al. |
| 5,549,942 A | 8/1996 | Watts |
| 5,567,504 A | 10/1996 | Schakel et al. |
| 5,578,258 A | 11/1996 | Grant et al. |
| 5,612,405 A | 3/1997 | Bainbridge et al. |
| 5,624,471 A * | 4/1997 | Gaeta et al. ............ 51/295 |
| 5,625,999 A | 5/1997 | Buzza et al. |
| 5,712,012 A * | 1/1998 | Forman et al. ............ 428/43 |
| 5,750,225 A | 5/1998 | Petty |
| 5,762,109 A | 6/1998 | Matthews et al. |
| 5,765,586 A | 6/1998 | Facas et al. |
| 5,776,841 A | 7/1998 | Bondoc et al. |
| 5,783,268 A * | 7/1998 | Noonan et al. ............ 428/34.5 |
| 5,783,623 A * | 7/1998 | Skoufis et al. ............ 524/459 |
| 5,836,357 A | 11/1998 | Kittson et al. |
| 5,953,818 A | 9/1999 | Matthews et al. |
| 5,958,137 A | 9/1999 | Caldwell et al. |
| 5,985,429 A | 11/1999 | Plummer et al. |
| 6,000,437 A | 12/1999 | Ponder et al. |
| 6,148,867 A | 11/2000 | Matthews et al. |
| 6,207,245 B1 | 3/2001 | Miller et al. |
| 6,213,522 B1 | 4/2001 | Jacobson et al. |
| 6,231,927 B1 | 5/2001 | Ruid |
| 6,270,865 B1 | 8/2001 | Noonan et al. |
| 6,284,313 B1 * | 9/2001 | Matthews et al. .......... 427/244 |
| 6,331,350 B1 | 12/2001 | Taylor et al. |
| 6,451,432 B1 * | 9/2002 | Azzopardi et al. .......... 428/429 |
| 6,457,237 B1 | 10/2002 | Matthews et al. |
| 6,555,951 B2 | 4/2003 | Jeoung |
| 6,769,455 B2 * | 8/2004 | Toas et al. ............ 138/149 |
| 2001/0033782 A1 | 10/2001 | Conley |
| 2001/0033926 A1 | 10/2001 | Matthews et al. |
| 2002/0127399 A1 | 9/2002 | Mankell et al. |
| 2002/0146521 A1 | 10/2002 | Toas et al. |
| 2003/0008092 A1 | 1/2003 | Toas et al. |
| 2003/0032351 A1 | 2/2003 | Horner, Jr. et al. |
| 2003/0056229 A1 | 3/2003 | Crabtree et al. |
| 2003/0068943 A1 | 4/2003 | Fay |
| 2003/0236043 A1 | 12/2003 | Calzavara et al. |
| 2004/0038608 A1 | 2/2004 | Shaw et al. |
| 2004/0118472 A1 | 6/2004 | Mota et al. |
| 2004/0137181 A1 * | 7/2004 | Ruid et al. ............ 428/36.91 |
| 2005/0031819 A1 * | 2/2005 | Mankell et al. .......... 428/36.91 |

FOREIGN PATENT DOCUMENTS

| | | |
|---|---|---|
| WO | WO 99/00338 | 1/1999 |
| WO | WO 01/31131 A1 | 5/2001 |

OTHER PUBLICATIONS

DEE FO/Agitan Defoamers, reprinted Jan. 21, 2003 at http://www.ultraadditives.com.*

Aircon, "Ventilation, Extraction and Air Conditioning—Installation Materials", Nov. 1991.

CertainTeed Corporation, "Certa*Faced Ultra*Duct Marketing Plan", Nov. 22, 1993.

CertainTeed Corporation, CertainTeed Building Solutions, "Product Information," CertainTeed Duct Insulation.

CertainTeed Corporation, "List Prices—ToughGard™ Duct Board", Oct. 1, 1994, Valley Forge, Pennsylvania, USA.

CertainTeed Corporation, "Product Specification: PS 57.00", May 23, 1994.

CertainTeed Corporation, "Product Sheet—ToughGard™ Duct Board Fiber Glass Duct Board Systems", 1994, Valley Forge, Pennsylvania, USA.

CertainTeed Corporation, "Raw Material Specification: Certa*Faced Ultra*Duct Mat Facing", Jun. 23, 1994.
CertainTeed Corporation, "Specification Sheet—ToughGard™ Duct Board with Enhanced Surface", Jan. 2002.
CertainTeed Corporation, "Specification Sheet—ToughGard™ Duct Liner with Enhanced Surface", 2001.
CertainTeed Corporation, "Specification Sheet—Ultra*Duct™ Gold", Mar. 2002.
CertainTeed Spec. Sheet, ToughGard™ Duct Board, 2 pages, Feb. 2002.
CETIAT "Test Report" Jul. 24, 1991, 6 pages (including translation attached).
Climaver® 234.
Climaver® 254.
Climaver® 264.
Climaver 284-234 "Construction and self-support air conditioning ducts", 18 pages (including translation attached).
Climaver Plata—Specification of a Product—relevance on first page density 70 mm per liter cube (no translation attached).
Elasti-Glass® R3100B Series Glass Fiber Mats, Schuller, 2 pages, May 1997.
France-Air, "Glass Fibre panels for air ducts" 21 pages (including translation attached).
French Republic, National Testing Laboratory, Nov. 28, 1998, 18 pages (including translation attached).
Glasuld "Product Data-Industrial Sheet Black" Sheet: 172 page 1, Nov. 1989, 1 page (14 pages, including translation of parts of the Danish ventilation attached).
Glasuld "Ventilation-kanaler".
Isover "Gama Climaver".
Isover Gullfiber—translation of the relevant parts of the Swedish Product Catalogue for Technical Insulation Mar. 1989.
Isover "Price List" Jan. 1991, 51 pages (including translation attached).
Isover Saint-Gobain Roche & Verre-Insulation and Air Conditioning, Mar. 1990, 8 pages (including translation attached).
Johns-Manville Fiber Glass, "Micro-Aire Duct Systems Fabrication Manual", USA.
Johns-Manville Manufacturing, "Product Specification—Micro-Aire Duct Board Standard Duty Heavy Duty Spec No. 4365-20", 1971-1973, USA.
Johns-Manville Manufacturing, "Finished Product Specification—Micro-Aire Duct Board Standard Duty Heavy Duty Spec No. 4365-15", 1971-1973, USA.
Johns-Manville, Air Handling Systems—SuperDuct™ Coated High Performance Air Duct Board, Type 475 & 800, AHS 200 Jun. 2000.
Johns-Manville, "Air Handling Systems—Linacoustic RC™ Fiber Glass Duct Liner with Reinforced Coating System," (preliminary product information), AHS-329 Feb. 2002.
Knauf Air Duct Bd., Form No. AH-SS-2 Effective: Jan. 1998, 2 pages.
Knauf Fiber Glass GmbH, "Submittal Sheet—Air Duct Board-M with Hydroshield Technology", Oct. 2000, USA.
Knauf Fiber Glass Insulation—Products 7 pages, Feb. 2002.
North American Insulation Manufacturers Association, "Fibrous Glass Duct Construction Standards", 2nd Edition, 1993.
Owens Corning, "Submittal Sheet—Aeromat Duct Liner", May 2001, USA.
Owens Corning, "Submittal Sheet—EnDura Coat Duct Board", May 2001, USA.
"Precision Coating Rods and Laboratory Products," Industry Tech, Oldsmar, FL.
Roclaine Isover, "Recommended Prices Jan. 1993," Cristaleria Espanola S.A., Insulation Division, Jan. 1993, 3 pages (translation attached).
"Smooth Stainless Steel Rods, etc.", RD Specialites, Webster,NY.
Testing Data from the Competitive Audit on Mar. 25, 1999, 3 pages.
Underwriters Laboratories Inc., "Report on Air Ducts", Jun. 8, 1992, Northbrook, Illinois, USA.
Underwriters Laboratories Inc., "Gas and Oil Equipment 1993".
Underwriters Laboratories Inc., "Gas and Oil Equipment 1994".
Underwriters Laboratories Inc., "Gas and Oil Equipment 1995".
Underwriters Laboratories Inc., "Investigation of 'Climaver 284' Air Duct Board", Dec. 19, 1991, Northbrook, Illinois, USA.
Weiss, Herbert L., Coating and Laminating, Converting Tech. Co., Milwaukee, WI, pp. 7-9, 196-202, 1977.
"Wire Wound Rod," Lembo-ITTI, http://www.lembo-itti.com/fx170005.htm Oct. 20, 1998.
CertainTeed—CertaPro™ (FiberGlass Insulation), Commercial Insulation, © 2003 CertainTeed Corporation.
CertainTeed—Product—Certapro™ Commercial Board, http://www.certainteed.com/pro/insulation/html/Commercial/ins_com_combrd.htm, Aug. 21, 2003.
CertainTeed—Commercial Board Insulation, http://www.allinterior.com/showrooms/certainteed/scenery/commercialboardinsulation.htm, Aug. 21, 2003.
CertainTeed, Product Index "Commercial Insulation,"http://www.certainteed.com/CertainTeed/Underfined/Insulation/Prodindex/Commercial, May 25, 2004.
CertainTeed, "Product Index" Mechanical/HVAC Insulation, http://www.certainteed.com/CertainTeed/Undefined/Insulation/Prodindex/Mechanical, Jun. 21, 2004.
"CertainTeed, "Product Index" Residential Insulation, http://www.certainteed.com/CertainTeed/Undefined/Insulation/Proindex/Residental, May 25, 2004".
CertainTeed, "CertainTeed Product Information," CertainTeed Building Solutions, not later than Dec. 30, 2002.
CertainTeed, Product Sheet—ToughGard™ Duct Board with Enhanced Surface, http://www.certainteed.com/pro/insulation/html AHprod/ins_mech_tgdb.html, Jul. 31, 2003.
CertainTeed Specification Sheet—Acousta Blanket™ Black Insulation, May 2003.
CertainTeed Specification Sheet—AcoustaBoard™ Black Insulation, May 2003.
CertainTeed Specification Sheet—CertaPro™ AcoustaBoard™ Black, Oct. 2002.
CertainTeed Specification Sheet—CertaPro™ AcoustaBlanket Black™, Oct. 2002.
CertainTeed Specification Sheet—CertaPro™ AcoustaTherm™ Batts, May 2001.
CertainTeed Specification Sheet—CertaPro™ Commercial Board, May 2001.
CertainTeed Specification Sheet—CertaPro™ Partition Batts, Jun. 2002.
CertainTeed Specification Sheet—CertaPro™ Thermal Extended Flange Batts, Oct. 2002.
CertainTeed Specification Sheet—CertaPro™ Thermal Foil Faced Batts, Oct. 2003.
CertainTeed Specification Sheet—CertaPro™ Thermal FSK-25 Faced Batts, Jun. 2003.
CertainTeed Specification Sheet—CertaPro™ Thermal Kraft Faced Batts, Oct. 2002.
CertainTeed Specification Sheet—Basement Wall and Masonry Wall Fiber Glass Building Insulation, Apr. 2004.
CertainTeed Specification Sheet—Commercial Blanket Insulation, Apr. 2000.
CertainTeed Specification Sheet CrimpWrap™ Crimped Pipe and Tank Wrap, Dec. 2002.
CertainTeed Specification Sheet, EZR™ Fiber Glass Building Insulation, Jan. 2004.
CertainTeed Specification Sheet, Fiber Glass Building Insulation, Apr. 2004.
CertainTeed Specification Sheet, FlameChek™ Duct Insulation, Apr. 2002.
CertainTeed Specification Sheet, FlameChek™ Plenum Insulation, Nov. 2002.
CertainTeed Specification Sheet, FlameChek™ Plus 2 Duct Insulation (Single Layer System), Apr. 2002.
CertainTeed Specification Sheet—Metal Building Insulation 202-96, Jun. 2003.
CertainTeed Specification Sheet—OEM Acoustical Board Insulation, Mar. 2002.
CertainTeed Specification Sheet—Preformed Pipe Insulation, Aug. 2003.

CertainTeed Specification Sheet, Soft Touch™ Duct Wrap Insulation, Aug. 2003.
CertainTeed Specification Sheet—Sound Attenuation Batts Acoustical Ceiling Batts NoiseReducer™ Batts, Nov. 2003.
CertainTeed Specification Sheet—SpeedyR™ Tabless Batts, Sep. 2003.
CertainTeed, "Specification Sheet—ToughGard™ Duct Board", Apr. 2002.
CertainTeed, Specification Sheet—ToughGard™ R Duct Liner with Enhanced Surface, Apr. 2004.
CertainTeed, Specification Sheet—ToughGard Rigid Liner Board with Enhanced Surface, Mar. 2002.
CertainTeed Corporation, Specification Sheet—Ultra*Duct™ Duct Board, Apr. 2001 or Mar. 2002.
CertainTeed Corporation, "Specification Sheet—Ultra*Duct™ Gold", Aug. 2003.
CertainTeed Specification Sheet—Ultralite® Duct Liner, Apr. 2003.
CertainTeed Specification Sheet—Universal Blanket, Aug. 2003.
CertainTeed ToughGard™ Duct Board, http://www.certainteed.com/cinsulate/cict00801p.html, Sep. 4, 2003.
CertainTeed, ToughGard™ Duct Board Fiber Glass Duct Board Systems.
Fiber-Glass Duct Systems, http://www.tpub.com/steelworker2/27.htm, Aug. 14, 2003.
IBACOS, Fibrous Glass Duct Board White Paper, 2003.
Isover Gullfiber—translation of the relevant parts of the Danish ventilation duct product "Industriplad Sort" and the corresponding Ventilation Duct Application brochure.
Isover Roclaine, "Recommended Prices Jan. 1990," Cristaleria Espanola S.A., Insulation Division, Jan. 1993, 3 pages (translation attached).
Isover Roclaine, "Recommended Prices Jan. 1991," Cristaleria Espanola S.A., Insulation Division, Jan. 1993, 3 pages (translation attached).
Johns-Manville, "Super Duct™" Air Duct Board Fabrication Instructions, AHS-204, Feb. 1998.
Johns Manville, Fiber Glass Mat (Acrylic Binder), Material Safety Data, Sheet ID: 1014, Section 1—Chemical Product and Company Identification pp. 1-6, Oct. 21, 2002.
Johns-Manville Manufacturing, "Finished Product Specification—Mat Faced Mad Board Spec No. 4365-15.6", 1971-1973, USA.
Johns Manville, Glass Fiber Mats, Elasti-Glass® 3200B Series, 1 p., Oct. 30, 2002.
Johns-Manville, "Type PM 10/3 Microlith®—Glass Fiber Nonwoven", Nov. 2003.
Johns-Manville, "Type PM 10/4 Microlith®—Glass Fiber Nonwoven", Dec. 2003.
Knauf, Air Duct Board-M with Hydroshield™ Technology, Submittal Sheet, Form No. AH-SS-6, Oct. 2000.
Knauf Fiber Glass Insulation—Products, www.knauffiberglass.com/index.cfm?fuseaction=prd.dspProdDetail&ID=, pp. 1-7, Aug. 25, 2003.
Knauf Fiber Glass Insulation—Products, Knauf Air Duct Board-M www.Knauffiberglass.com/index.cfm?fuseaction=prd.dspProdDetail&ID=14, pp. 1-7, Jan. 8, 2003.
Lydall, 23# Manniglas® 1803 WHB, Development Grade-Lot F2956, Data Sheet, 1 page, Nov. 20, 2002.
Lydall, 27# Manniglas® 1807, Development Grade-Lab Handsheets, Data Sheet, 1 page, Jan. 8, 2004.
Lydall, 40# Manniglas® 1786 Black, Development Grade-Lot F2933, Data Sheet, 1 page, Nov. 2002.
Lydall, 40# Manniglas® 1886 Black, Data Sheet, 1 page, Aug. 2002.
Lydall, 40# Manniglas® 1886 BX Black, Developmental Lot F2434, Data Sheet, 1 page, Dec. 2001.
Mid-rise and High-rise Exterior Building Envelope Board, Current System—Massachusetts "specifications".
North American Insulation Manufacturers Association, "Fabrication Dimensions for 2" (R-8.7) Fibrous Glass Duct Board, Pub. No. AH-136, Aug. 2002.
North American Insulation Manufacturers Association, "Facts About Using Sealants in Fiber Glass Air Handling Systems", Insulation Facts #36, Pub. No. AH 125, Sep. 2000.
North American Insulation Manufacturers Association, "Fibrous Glass Commercial Insulation Boards", Insulation Facts #67, www.naima.org, Jan. 2003.
North American Insulation Manufacturers Association, "Fibrous Glass Duct System", Insulation Facts #64, Pub. No. AH 137, Jan. 2003.
North American Insulation Manufacturers Association, "Fibrous Glass Duct Wrap", Insulation Facts #66, www.naima.org, Jan. 2003.
RD Specialties, "Smooth Stainless Stell Rods, etc.", Webster, NY.
ROXUL®—The Better Insulation™—RHT™ 605 Commercial Board—Design No. W605, RHT Industrial Board, http://199.202.236.133/canada/product_details.asp?id=82, Aug. 21, 2003.
ROXUL®—The Better Insulation™—Technical Product Information, Board Insulation 15080 RHT™ 605, Roxul, Inc., Jun. 1, 2002.
ROXUL®—The Better Insulation™—Technical Product Information, Board Insulation 15080, RHT™ 606, Roxul, Inc., Jun. 1, 2002.
"Climaver 284-234", Isover, trade literature in French plus English translation, 10 pp., 1988.
"Fiber Glass Insulation for HVAC Duct Systems", CertainTeed, trade literature, 14 pp., undated.
International Search Report in PCT/US00/26540, dated Aug. 2, 2001.
"Knauf Duct Liner M Submittal Sheet", Knauf Fiberglass, Trade literature, AHSS-3, 6 pp., 1986.
Manville Air Handling Systems, Schuller, trade literature, pp. 2395-2413, 20 pp., undated.
Noonan et al., Submission of a Revised Brief, pp. 1-16, 17 pp., 2000.
Rivers, David, Declaration, Knauf Fiber Glass, *GMBH* v. *CertainTeed Corp.,* 32 pages, Exhibit A, 1991; Exhibit B, 1990; Exhibit C, 1994, Exhibit D, 1993, Exhibit E, undated.
"Schuller Fiber Glass Duct Liner Insulation Guide for Metal Ducts", Schuller, trade literature, 9 pp., undated.

* cited by examiner

MOISTURE REPELLENT AIR DUCT PRODUCTS

FIELD OF THE INVENTION

The present invention relates in general to building materials products and, in particular, to moisture-resistant fibrous air duct products and methods for making same.

BACKGROUND OF THE INVENTION

Ducts and conduits are used to convey air in building heating, ventilation and air conditioning (HVAC) systems. In many applications, especially in commercial and industrial construction, the ducts are lined with flexible thermal and sound insulating material. The lining enhances the thermal efficiency of the duct work and reduces noise associated with movement of air therethrough. Duct liner may comprise any suitable organic material or inorganic material, e.g., mineral fibers such as fiber glass insulation or the like. Typical fiber glass duct liners, for example, are constructed as fiber glass mats having densities of about 1.5 to 3 pounds per cubic foot (pcf) and thicknesses of about 0.5 to 2 inches. To prevent fiber erosion due to air flow, the insulation may include a coating of on its inner or "air stream" surface. The air stream surface of the insulation is the surface that conveys air through the duct and is opposite the surface that contacts the duct sheet metal in the final duct assembly. The coating also serves to protect the insulation during brush and/or vacuum cleaning of the interior of the duct. Examples of duct liners having coatings on their inner surfaces are provided in U.S. Pat. Nos. 3,861,425 and 4,101,700. Several coated insulation duct liners are marketed under the trade designations ToughGard® by Certain-Teed Corp. of Valley Forge, Pa., Aeroflex® and Aeromat® by Owens Corning Fiberglas Corp. of Toledo, Ohio, Permacote®, and Polycoustic™ by Johns Manville Corp. of Denver, Colo.

Other insulated HVAC systems use ducts either fabricated from or lined with rigid duct boards or tubes. Duct boards are rigid members formed from resin-bonded mineral fibers and whose air stream surfaces may also be provided with protective coatings. Duct boards typically have densities of about 3 to 6 pounds per cubic foot (pcf) and thicknesses of between about 0.5 to 2 inches. Coated and uncoated duct boards are marketed under a variety of trade designations from the aforementioned manufacturers of duct liners. Whether provided on duct liners or duct boards, dedicated water-resistant coatings add to the cost and complexity of manufacturing these products.

It is well known that microorganisms will grow in an environment where moisture and nutrients are present and that many species of microorganisms have a negative impact on indoor air quality (IAQ). If liquid water leaks into air duct insulation, the water may collect and stagnate in the insulation and support the growth of microorganisms.

To address the problem of microorganism growth in HVAC systems, U.S. Pat. Nos. 5,314,719; 5,379,806; 5,487,412 and 5,783,268 disclose providing antimicrobial agents on or in the air-conveying surfaces of impermeable duct liners and/or duct boards. However, these patents offer no insight into effective ways of preventing water that enters duct work from collecting and stagnating in the duct insulation material and causing microbe formation therein. Additionally, antimicrobial agents have very limited zones of effectiveness. That is, they tend to prevent microbe formation only in their immediate vicinity. U.S. Pat. No. 5,314,719, for example, describes a zone of antifungal inhibition of about one millimeter. Typical duct liners and duct boards have insulation thicknesses ranging from about one-half to two inches. In these products, such a limited zone of inhibition would be essentially useless in preventing microorganism formation caused by duct insulation that becomes saturated by water entering through the exterior walls and seams of the duct.

Moisture impermeable coatings, if applied to the airstream surface of air duct insulation products, inhibit ingress of water into the insulation and attendant microorganism formation therein. U.S. Pat. No. 3,861,425 discusses the notion of providing HVAC ducts either composed of or lined with fibrous glass insulation media such as batts, mats, boards or the like with such coatings. While certain coatings may provide the benefits of fiber erosion protection and moisture resistance, they add to the cost and complexity of the products and their methods of manufacture. Coatings applied to the air stream surface of fibrous insulation products may be applied to those products after their formation. This requires application of the coating to the previously formed insulation product by brush, roller, sprayer or by some other means or method and thereafter allowing the coating to cure or dry. This post-formation coating step may prolong the time required to manufacture the insulation product and, whether performed manually or automatically, must be carefully monitored in order to assure uniformity in application of the coating.

As an alternative to coated duct liners and duct boards, at least CertainTeed Corp. and Knauf Fiber Glass GmbH offer duct liners or duct boards having glass fiber insulation covered with a layer of non-woven facing material which defines the air stream surface of those products. The facing material produces a durable surface that protects the air duct from fiber erosion.

Many HVAC systems do not expose their insulation air ducts to significant fiber erosion because they operate at low air velocities. Hence, they do not need insulation products having protective coatings or facing material coverings. Indeed, the aforementioned manufacturers of insulation products offer several uncoated duct liners and duct boards for these sorts of HVAC duct work installations. However, both uncoated fibrous insulation HVAC duct products and similar products that are covered with facing material possess limited inherent moisture resistance. Consequently, they are susceptible to microorganism formation in the event they become wet.

An advantage exists, therefore, for water-resistant fibrous air duct insulation products, as well as simple and economical methods for making such products.

SUMMARY OF THE INVENTION

The present invention provides water-resistant fibrous air duct insulation products and methods for making such products. Although the principles of the invention may be adapted to unfaced duct liners, duct boards and duct tubes, according to a presently preferred embodiment the invention provides a duct board or tube comprising a first layer of resin-bonded glass fiber mat having a second layer of durable, preferably non-woven, facing material adhered thereto, wherein the facing material defines the air stream surface for the board or tube. The duct board or tube is preferably rendered water-repellent by incorporating a hydrophobic agent into the adhesive used to adhere the second layer to the first layer. In this way, liquid water in the interior of the duct will be repelled from entering the insulation, thereby reducing the likelihood of microbial growth in the insulation.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
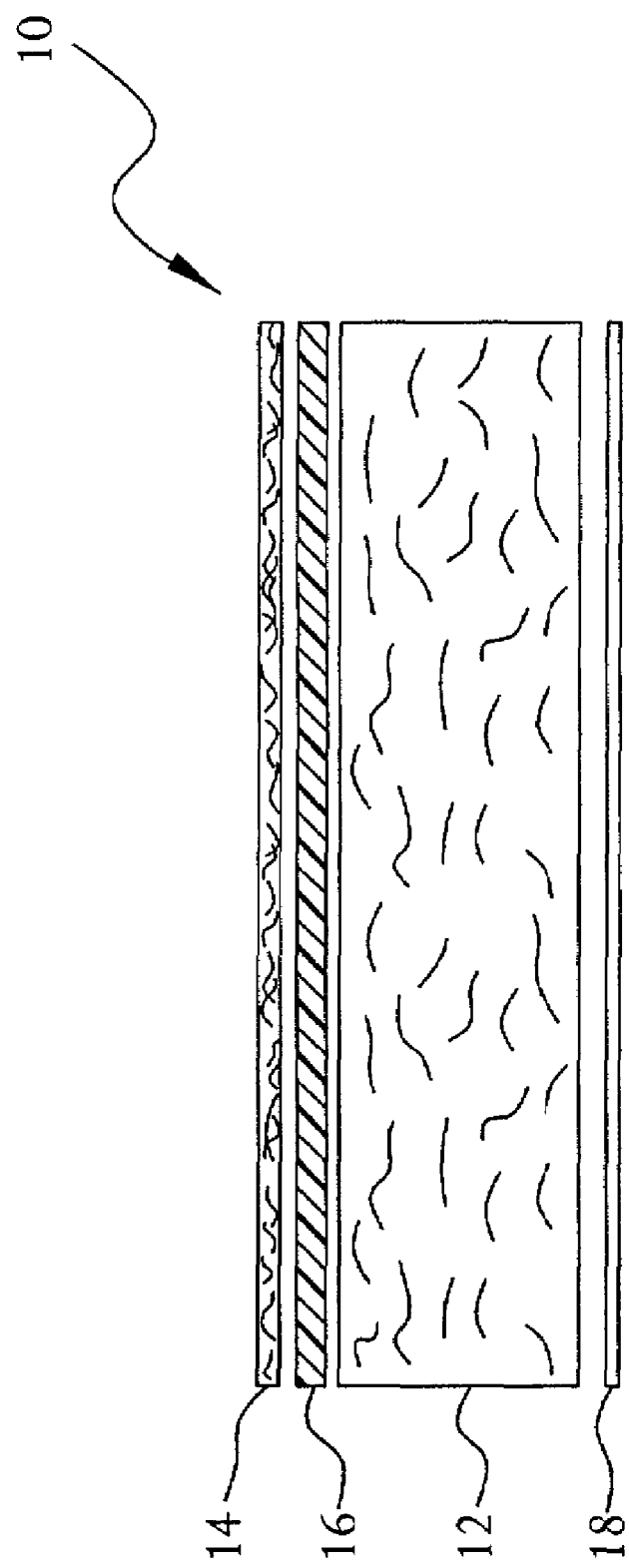
FIG. 1 is an exploded view of an insulated air duct product constructed according to the present invention.

Referring to FIG. 1, there is shown a segment of an insulated air duct product 10 in accordance with the present invention. Product 10 may be a rigid duct board or tube comprising a first layer 12 of mineral fibers such as glass fibers, refractory fibers or mineral wool fibers bonded by a suitable resin and a second layer 14 of durable, preferably non-woven, organic or inorganic facing material adhered thereto by adhesive 16, wherein the facing material defines the air stream surface for the board or tube. Binders that may be used to bind the fibers of layer 12 may include, without limitation, the phenolic binders disclosed in U.S. Pat. Nos. 5,300,562 and 5,473,012, the disclosures of which are incorporated herein by reference. An example of such a resin is a phenol-formaldehyde resole resin, wherein a mole ratio of formaldehyde to phenol is from about 2.5:1 to 4.2:1. Product 10 may have a density of about 3 to 6 pounds per cubic foot (pcf) and a thickness of between about 0.5 to 2 inches. The thickness and density of insulation layer 12 will be dictated by the levels of acoustic and/or thermal insulation that are desired or necessary for a particular building installation. The duct board or tube is preferably rendered water-repellent by incorporating a hydrophobic agent into adhesive 16. In this way, liquid water or other aqueous liquids in the interior of the duct will be repelled from entering the insulation layer 12, thereby reducing the likelihood of microbial growth in the insulation. Preferably, a foil/scrim/paper or other suitable vapor retarder layer 18 is adhered or otherwise affixed to the face of insulation layer 12 opposite the facing layer 14 to prevent moisture from entering the insulation from the ambient environment.

Figure 2:
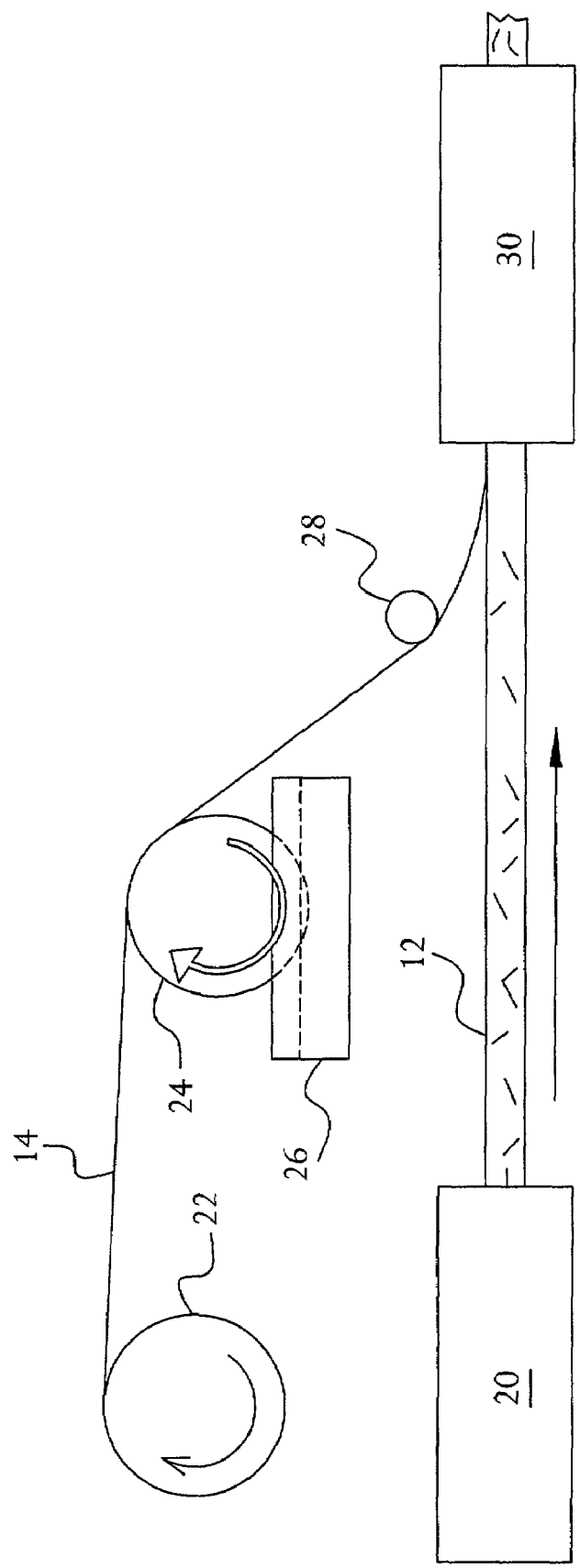
FIG. 2 is a schematic view of an apparatus for manufacturing a duct board in accordance with the present invention.

Referring to FIG. 2, as is conventional, insulation layer 12 may be made in a forming station 20 by melt spinning molten material, such as glass, into fine fibers, and spraying a binder, such as a phenolic resin binder in an aqueous carrier, onto the fibers, and collecting the fibers as a web on a conveyor. The web is then passed through a conventional curing oven or other means for curing and compressing the web to a desired thickness after the web exits the forming station.

In the process of the present invention, a continuous web of facing layer 14 is dispensed from a roll 22 and is applied to one surface of insulation layer 12 prior to curing of the binder in the insulation. Prior to adhering the facing layer 14 to the insulation layer 12, an adhesive is applied to either or both of the facing layer 14 and the insulation layer 12. According to a presently preferred arrangement, adhesive is continuously applied to the underside of facing layer 14 via an applicator roll 24 rotatably supported in a pan 26 or similar receptacle which contains adhesive appropriate for securely adhering layers 12,14 to one another following curing. It will be understood that adhesive may be applied to either or both of layers 12,14 by other means such as spraying or brushing. Although not limited thereto, a preferred adhesive is a phenolic resin having generally the same or similar composition as the binder that is used to bind the fibers in insulation layer 12. However, phenolic resin adhesives have limited hydrophobicity. As a consequence, if an unmodified phenolic resin adhesive were used to adhere the first and second layers 12 and 14, the resultant product 10 would be susceptible to absorbing water and serving as a host for microorganism formation if the facing layer were to become exposed to moisture.

Accordingly, the adhesive used to attach layer 14 to layer 12 preferably includes at least one hydrophobic agent such as silicone, oil, fluorocarbon, waxes or the like in an effective amount sufficient to render the product essentially impermeable to water and resistant to aqueous solutions containing moderate quantities of solvent. Effective amounts of hydrophobic agent may range in a ratio of about 1:20 to 1:200, and more preferably about 1:40, hydrophobic agent to binder. A commercially available hydrophobic agent suitable for these purposes is DC 347 silicone emulsion manufactured by Dow Corning Corporation of Midland, Mich.

The layers 12,14 may travel at any desired synchronous speed and the applicator roll 24 may be rotated at any speed sufficient to thoroughly apply the adhesive to the underside of the moving facing layer web 14. Acceptable results have been demonstrated at a moving layer speeds of about 80 feet per minute coupled with applicator roll 24 rotation speeds of about 3–20 rpm. A placement means 28 such as an idler roller or the like may be used to facilitate placement of the layer 14 on layer 12. Product 10 is then passed by an unillustrated conveyor to a curing oven 30. While in the oven, layers 12, 14 are simultaneously heated in order to cure the binder and adhesive 16. Preferably, layers 12, 14 are held together by unillustrated heated platens or the like under sufficient pressure to compress the facing layer 14 against the insulation layer 12. Heating the two layers under compression securely bonds the facing layer 14 to the thermal insulation layer 12. Vapor retarder layer 18 (not shown in FIG. 2) may be applied to the surface of insulation layer 12 opposite facing layer 14 after the insulation board exits the curing oven.

Moreover, although illustrated herein as it would appear when manufactured as a planar duct board, product 10 may also be formed into a tubular shape by any suitable techniques known in the art whereby the product may alternatively be constructed and function as an insulated duct tube or tubular duct liner.

TABLE 1 depicts the liquid holdout characteristics of product 10 constructed in accordance with the present invention versus those of a control specimen of unmodified ToughGard® duct board from CertainTeed Corp. The products were evaluated using a test similar to the International Nonwoven & Disposables Association (INDA) standard test for alcohol repellency number IST 80.6-92 whose purpose is to measure the resistance of nonwoven fabrics to wetting and penetration by alcohol and alcohol/water solutions. Alcohol repellency serves as a rough estimate of the surface energy or repellency of the test material surface. The water and isopropanol solution holdout times are for 2 ml samples of deionized water or deionized water in a mixture with isopropanol in the indicated quantities.

TABLE 1

| Sample | Identification | Water Holdout Time (hrs) | Isopropanol Solution Holdout Times (hrs/mins) | |
|---|---|---|---|---|
| | | | 10% | 20% |
| ToughGard ® Duct Board | Control | 2+ | <1 hr | ≦1 min |
| Modified ToughGard ® Duct Board (with Dow Corning ® DC 347 silicone) | Product 10 | 2+ | >1 hr | 5–30 min |

As TABLE 1 reveals, both the control and product 10 exhibit water holdout times of greater than 2 hours. Although not shown in TABLE 1, for aqueous isopropanol solutions having solvent concentrations of 30% by volume of solvent and higher, the liquid holdout times of both products are negligible. However, the liquid holdout times of product 10 are considerably greater than those of the control with respect to the 10% and 20% isopropanol solutions.

Although the invention has been described in detail for the purpose of illustration, it is to be understood that such detail is solely for the purpose and that variations can be made therein by those skilled in the art without departing from the spirit and scope of the invention except as it may be limited by the claims.

What is claimed is:

1. An insulated air duct product comprising:
   a first layer formed from a mineral fiber insulation material bound with a resin binder; and
   a facing layer adhered to a surface of said first layer by an adhesive containing hydrophobic agent in a ratio of about 1:20 to about 1:200 hydrophobic agent to binder and the product is substantially impermeable to penetration of liquid water and resistant to penetration of aqueous solutions of about 20% by volume of isopropyl alcohol for 5–30 minutes, wherein said adhesive comprises said binder and said hydrophobic agent.

2. The product of claim 1 wherein the product is a duct board.

3. The product of claim 1 wherein the product is a duct tube.

4. The product of claim 1, wherein said hydrophobic agent is a fluorocarbon.

5. The product of claim 1 wherein said effective amount of hydrophobic agent is present in said adhesive in a ratio of about 1:40 hydrophobic agent to binder.

6. The product of claim 1, wherein:
   said mineral fiber insulation material is one of the group consisting of glass fibers, refractory fibers and mineral wool;
   said binder is a phenolic resin;
   said facing comprises a non-woven facing material.

7. The product of claim 1, wherein the adhesive comprises a thermosetting phenolic resin in an aqueous carrier.

8. The product of claim 1, wherein the adhesive contains an effective amount of hydrophobic agent to render the product resistant to penetration of aqueous solutions of about 20% by volume of isopropyl alcohol for 30 minutes.

9. The product of claim 1, wherein the resin is a phenol-formaldehyde resole resin.

10. The product of claim 1, wherein the product has a density of about 3 to 6 pounds per cubic foot and a thickness of about 0.5 to 2.0 inches, and the first layer comprises glass fiber material.

11. The product of claim 1, wherein the product has a density of about 3 to 6 pounds per cubic foot and a thickness of about 0.5 to 2.0 inches.

12. The product of claim 11, wherein the first layer comprises glass fiber material.

13. A method for making an insulated air duct product, said method comprising the steps of:
   (a) providing a first layer formed from a mineral fiber insulation material bound with a resin binder; and
   (b) adhering a facing layer to a surface of said first layer by an adhesive containing hydrophobic agent in a ratio of about 1:20 to about 1:200 hydrophobic agent to binder and the product is substantially impermeable to penetration of liquid water and resistant to penetration of aqueous solutions of about 20% by volume of solvent isopropyl alcohol for 5–30 minutes, wherein said at least one hydrophobic agent is selected from the group consisting of silicone, oil, fluorocarbon and waxes, wherein said adhesive comprises said binder and said hydrophobic agent.

14. The method of claim 13 wherein the product is a duct board.

15. The method of claim 13 wherein the product is a duct tube.

16. The method of claim 13, wherein the adhesive comprises a thermosetting phenolic resin in an aqueous carrier.

17. The method of claim 13, wherein the adhesive contains an effective amount of hydrophobic agent to render the product resistant to penetration of aqueous solutions of about 20% by volume of isopropyl alcohol for 30 minutes.

18. The method of claim 13, wherein the product has a density of about 3 to 6 pounds per cubic foot and a thickness of about 0.5 to 2.0 inches, and the first layer comprises glass fiber material.

19. The method of claim 13, wherein the resin is a phenol-formaldehyde resole resin.

20. The method of claim 19, wherein a mole ratio of formaldehyde to phenol is from about 2.5:1 to 4.2:1.

* * * * *